(12) United States Patent
Pietron et al.

(10) Patent No.: US 9,618,407 B2
(45) Date of Patent: Apr. 11, 2017

(54) MAGNETIC SENSOR PACKAGING FOR TRANSMISSIONS

(71) Applicant: Ford Global Technologies, LLC, Dearborn, MI (US)

(72) Inventors: Gregory Michael Pietron, Canton, MI (US); Joseph F. Kucharski, Livonia, MI (US); Nimrod Kapas, Canton, MI (US); Diana Yanakiev, Birmingham, MI (US); Mark Richard Dobson, Howell, MI (US); Yuji Fujii, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/016,654

(22) Filed: Feb. 5, 2016

(65) Prior Publication Data
US 2016/0153851 A1    Jun. 2, 2016

Related U.S. Application Data

(62) Division of application No. 13/771,258, filed on Feb. 20, 2013, now Pat. No. 9,285,282.

(51) Int. Cl.
*G01L 3/10*    (2006.01)
(52) U.S. Cl.
CPC .................................. *G01L 3/101* (2013.01)
(58) Field of Classification Search
CPC .... G01L 3/10; G01L 3/02; G01L 5/12; B62M 23/02
USPC ..................................................... 73/862.193
See application file for complete search history.

(56) References Cited

U.S. PATENT DOCUMENTS

| | | | |
|---|---|---|---|
| 4,071,125 A | 1/1978 | Jameson | |
| 4,887,461 A | 12/1989 | Sugimoto et al. | |
| 4,899,597 A | 2/1990 | Yagi et al. | |
| 5,092,182 A | 3/1992 | Ikeda et al. | |
| 5,165,286 A | 11/1992 | Hamamura et al. | |
| 5,493,921 A | 2/1996 | Alasafi et al. | |
| 5,526,704 A * | 6/1996 | Hoshina | G01L 3/105 73/862.333 |

(Continued)

FOREIGN PATENT DOCUMENTS

| CN | 101799338 A | 8/2010 |
|---|---|---|
| CN | 102607748 A | 7/2012 |

(Continued)

OTHER PUBLICATIONS

First Chinese Office Action for the corresponding Chinese Patent Application No. 201410058139.1 dated Dec. 30, 2016.

*Primary Examiner* — Lisa Caputo
*Assistant Examiner* — Octavia Hollington
(74) *Attorney, Agent, or Firm* — James Dottavio; Brooks Kushman P.C.

(57) ABSTRACT

Designs to package a magneto-elastic torque sensor in an automotive transmission for volume production applications are provided. A transfer case assembly includes a transfer case shaft having a magnetized region and a magnetic torque sensor, for detecting torque of the transfer case shaft, mounted on at least one bushing supporting the transfer case shaft. A drive axle assembly includes an axle housing, an input shaft having a magnetized region, and a magnetic torque sensor, for detecting torque of the input shaft, mounted to the axle housing.

3 Claims, 18 Drawing Sheets

(56) References Cited

U.S. PATENT DOCUMENTS

| | | | |
|---|---|---|---|
| 6,260,421 B1 | 7/2001 | Torbjornsson et al. | |
| 6,484,592 B2 * | 11/2002 | Sezaki | G01L 3/102 |
| | | | 73/862.335 |
| 6,487,925 B2 * | 12/2002 | Fischer | C23G 3/023 |
| | | | 74/337 |
| 6,688,445 B2 | 2/2004 | Otto | |
| 6,698,299 B2 | 3/2004 | Cripe | |
| 6,846,260 B2 | 1/2005 | Horiuchi | |
| 7,243,557 B2 | 7/2007 | May | |
| 7,258,949 B2 | 8/2007 | Frederiksson et al. | |
| 7,491,145 B2 | 2/2009 | Mizon et al. | |
| 7,579,827 B2 | 8/2009 | Burns et al. | |
| 7,685,891 B2 | 3/2010 | May | |
| 7,757,570 B1 | 7/2010 | Marin et al. | |
| 8,423,249 B2 | 4/2013 | Poskie et al. | |
| 8,626,417 B2 * | 1/2014 | Oral | B60W 30/18172 |
| | | | 701/85 |
| 8,844,379 B2 | 9/2014 | Pietron et al. | |
| 9,383,273 B2 * | 7/2016 | Kapas | G01L 3/102 |
| 2001/0029791 A1 | 10/2001 | Sezaki | |
| 2004/0145365 A1 | 7/2004 | Lutaud et al. | |
| 2009/0240416 A1 | 9/2009 | Oral | |
| 2009/0293642 A1 | 12/2009 | Schmitz | |
| 2010/0043570 A1 | 2/2010 | Grab et al. | |
| 2010/0199784 A1 | 8/2010 | Marin et al. | |
| 2012/0191308 A1 | 7/2012 | Poskie et al. | |
| 2012/0297895 A1 | 11/2012 | Kapas et al. | |

FOREIGN PATENT DOCUMENTS

| | | |
|---|---|---|
| EP | 1386127 A1 | 2/2004 |
| JP | 63312551 A | 12/1988 |
| JP | 64021255 | 1/1989 |
| JP | 04052537 | 2/1992 |
| JP | 04052538 | 2/1992 |
| WO | 02093121 A1 | 11/2002 |

* cited by examiner

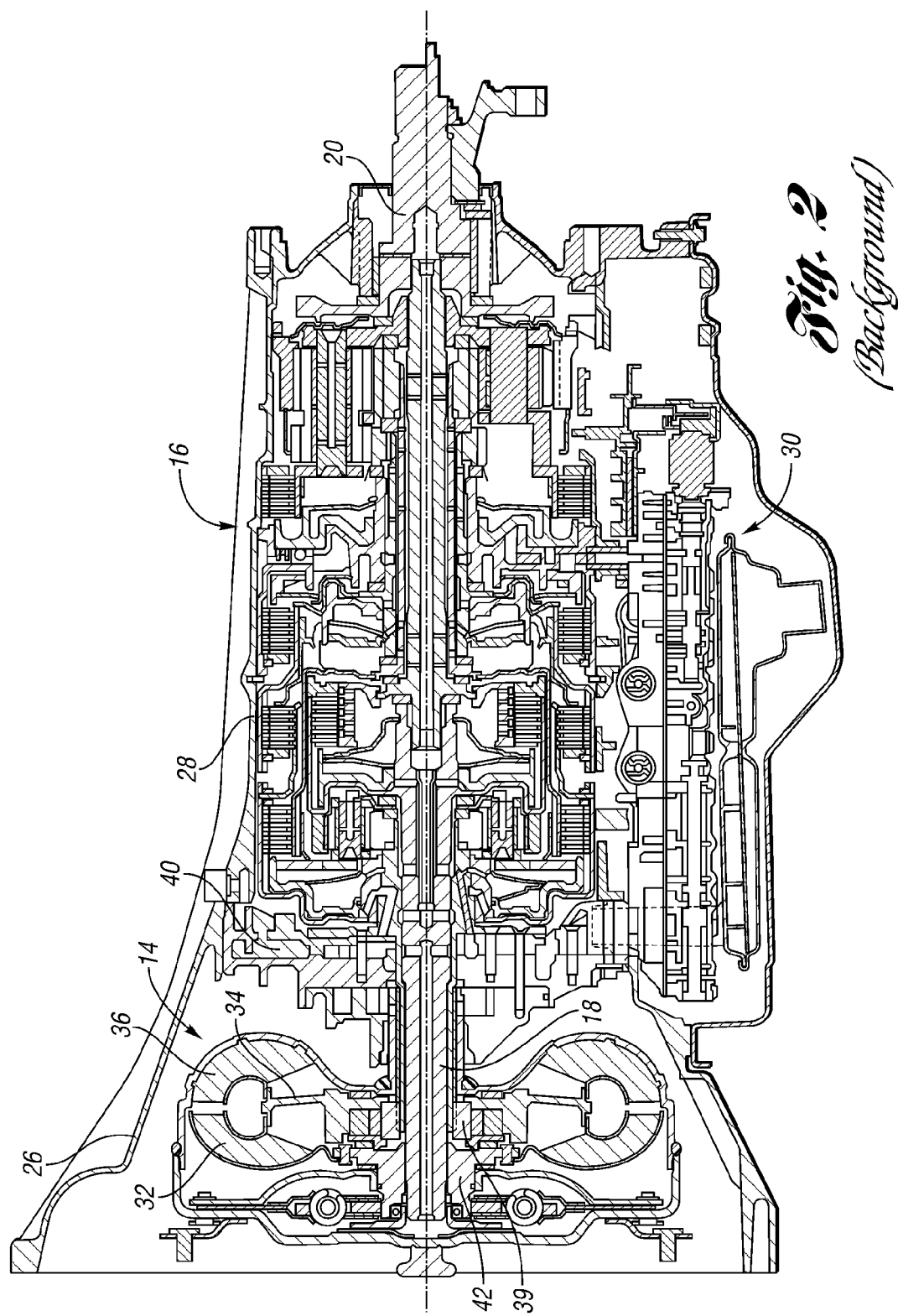

*(Background)*

*(Background)*

*(Background)*

*(Background)*

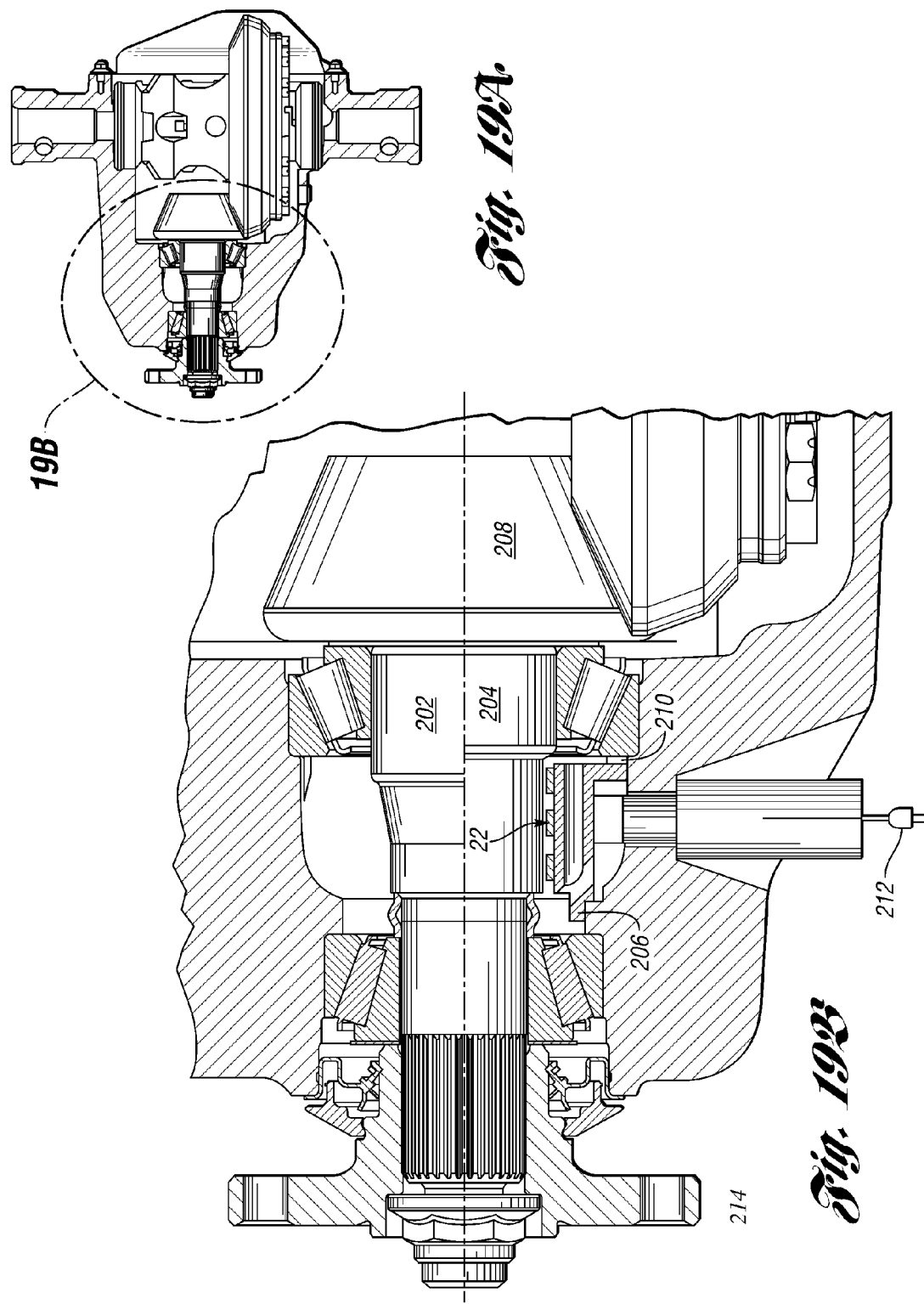

MAGNETIC SENSOR PACKAGING FOR TRANSMISSIONS

CROSS-REFERENCE TO RELATED APPLICATIONS

This application is a divisional of U.S. application Ser. No. 13/771,258, filed Feb. 20, 2013, now U.S. Pat. No. 9,285,282; the disclosure of which is hereby incorporated in its entirety by reference herein.

TECHNICAL FIELD

The present invention relates to automatic transmissions having magnetic sensors.

BACKGROUND

An automatic transmission of a vehicle includes an input shaft and an output shaft. The input shaft receives an input torque at an input speed from power derived from a power source such as an engine. The transmission converts the input torque at the input speed to an output torque at an output speed. The output shaft transmits the output torque at the output speed to traction wheels of the vehicle in order to propel the vehicle.

The transmission converts the input torque at the input speed to the output torque at the output speed by adjusting a gear ratio (for example, during an up-shift or down-shift) between the input and output shafts. The transmission shifting is accomplished by applying and/or releasing friction elements (such as clutches, band-brakes, etc.) to change speed and torque relationships by altering planetary gear configurations of the transmission. As a result, power flow paths are established and disestablished from the engine to the wheels.

The friction elements must be properly controlled in order to satisfactorily shift the transmission. To this end, information regarding the operation of the transmission is used to control the friction elements. For instance, information indicative of the input torque received by the input shaft and the speed of the input shaft and information such as vehicle speed and throttle opening may be used. Similarly, information indicative of the output torque transmitted by the output shaft and the speed of the output shaft may be used.

Torque and speed of the input shaft and the output shaft are typically estimated based on various type of available information. One way to avoid estimation is to use a magnetic sensor mounted within the transmission to directly detect the torque and/or speed parameters. However, installation and packaging of such magnetic sensors within limited spaces of the transmission may provide a challenge.

SUMMARY

Embodiments of the present invention are directed to designs for packaging magnetic sensors such as magnetoelastic torque sensors in automatic transmissions for volume production.

In one embodiment, the present invention provides a transmission having an output shaft and a magnetic torque sensor. The output shaft has a magnetized region. The sensor, for detecting torque of the output shaft, is mounted on at least one friction reduction member such as a bushing supporting the output shaft.

In one embodiment, the present invention provides a transmission having a transmission case, an output shaft, and a magnetic torque sensor. The output shaft has a magnetized region. The sensor, for detecting torque of the output shaft, is mounted to the transmission case.

In one embodiment, the present invention provides a transmission including a stator tube and a magnetic torque sensor. The stator tube encompasses an input shaft having a magnetized region. The stator tube has a window adjacent the magnetized region. The sensor, for detecting torque of the input shaft, is positioned within the window and affixed to the stator tube to be adjacent the magnetized region.

In one embodiment, the present invention provides a transmission including a transmission case, a gear having a magnetized region, and a magnetic torque sensor. The gear is one of an idler gear and a transfer gear. The sensor, for detecting torque of the output shaft, is mounted to the transmission case.

In one embodiment, the present invention provides a transmission including a transmission case, a hollow idler shaft having a magnetized region on an inner surface thereof, and a magnetic torque sensor. The sensor, for detecting torque of the idler shaft, is positioned within the idler shaft and mounted to the transmission case.

In one embodiment, the present invention provides a transmission including a transmission case, a differential drive carrier having a magnetized region, and a magnetic torque sensor. The sensor, for detecting torque of the driver carrier, is mounted to the transmission case.

In one embodiment, the present invention provides a transmission including a transmission case, at least one half-shaft having a magnetized region, and a magnetic torque sensor. The sensor, for detecting torque of the at least one half-shaft, is mounted on the transmission case.

In one embodiment, the present invention provides a transmission including a transmission case, an idler shaft, an idler gear, a transfer gear, and a magnetic torque sensor. The gears are spaced apart from one another about different portions of the idler shaft. The idler shaft includes a magnetized region in the space between the idler gear and the transfer gear. The sensor, for detecting torque of the idler shaft, is mounted on the transmission case adjacent to the magnetized region.

In one embodiment, the present invention provides a transfer case assembly. The assembly includes a transfer case shaft and a magnetic torque sensor. The transfer case shaft has a magnetized region. The sensor, for detecting torque of the transfer case shaft, is mounted on at least one friction reduction member such as a bushing supporting the transfer case shaft.

In one embodiment, the present invention provides a rear-wheel drive axle assembly having a rear-axle housing, an input shaft having a magnetized region, and a magnetic torque sensor. The sensor, for detecting torque of the input shaft, is mounted to the rear-axle housing.

BRIEF DESCRIPTION OF THE DRAWINGS

FIG. 2 illustrates a cross-sectional view of the torque converter and the transmission of the powertrain shown in FIG. 1 in which the transmission lacks both of an input shaft sensor and an output shaft sensor;

FIG. 19A illustrates a cross-sectional view of a magnetic torque sensor packaging design in a rear-wheel drive (RWD) axle in accordance with an embodiment of the present invention;

FIG. 19B illustrates an enlarged view of the encircled portion of FIG. 19A.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
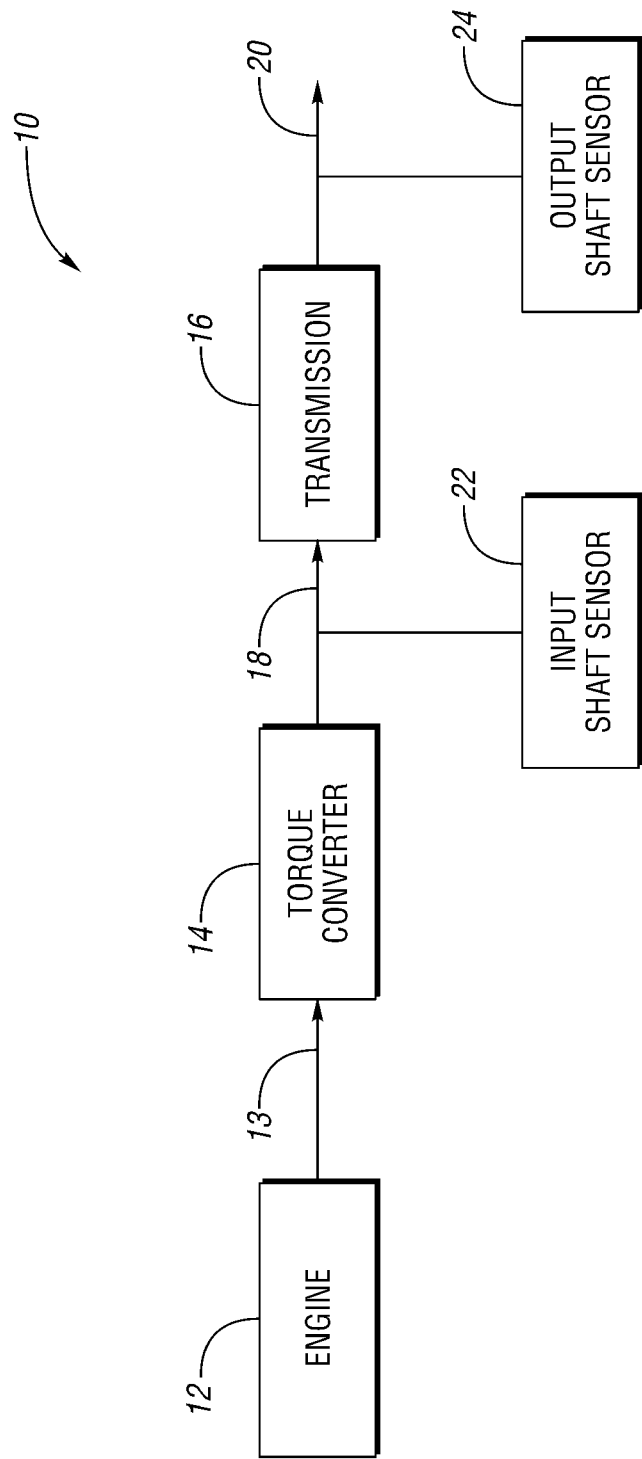
FIG. 1 illustrates a block diagram of a vehicle powertrain in accordance with embodiments of the present invention.

Referring now to FIG. 1, a block diagram of a vehicle powertrain 10 in accordance with embodiments of the present invention is shown. Powertrain 10 includes an engine 12, a torque converter 14, and an automatic transmission 16. Transmission 16 has an input shaft 18 and an output shaft 20. Engine 12 delivers torque to torque converter 14 via crankshaft 13 of engine 12 which is connected to torque converter 14. Torque converter 14 converts the engine torque into an input torque at an input speed and transmits the input torque at the input speed to input shaft 18 of transmission 16. Transmission 16 serves to change a transmission ratio and thus changes the input torque at the input speed into an output torque (for example, increased torque) at an output speed (for example, reduced speed). Transmission 16 transmits the output torque at the output speed to output shaft 20. Output shaft 20 is connected to a vehicle driveline (not shown) such that the output torque at the output speed may be used to drive wheels of the vehicle.

While not shown herein, embodiments of the present invention can be used as well in a hybrid powertrain that includes, for example, an engine and an electric motor without a torque converter.

Powertrain 10 further includes at least one of an input shaft sensor 22 and an output shaft sensor 24. Input shaft sensor 22 is associated with input shaft 18 and is configured to monitor at least one of (input) torque and (input) speed of input shaft 18. Similarly, output shaft sensor 24 is associated with output shaft 20 and is configured to monitor at least one of (output) torque and (output) speed of output shaft 20. Sensors 22 and 24 provide sensor signals indicative of the monitored information to a controller (not shown) for the controller to control operation of transmission 16 accordingly.

Referring now to FIG. 2, with continual reference to FIG. 1, a cross-sectional view of torque converter 14 and transmission 16 is shown. As shown in FIG. 2, torque converter 14 is encased within a torque converter case 26 and transmission 16 is encased within a transmission case 28.

Transmission mechanism 30 changes the input torque at the input speed received by input shaft 18 into an output torque at an output speed transmitted by output shaft 20. As illustrated in the right-hand side of FIG. 2, transmission mechanism 30 uses planetary gear sets. Embodiments of the present invention may be applied to other types of transmission mechanisms including, but not limited to, belt-drive transmissions, dual clutch transmissions, or continuously variable transmissions.

Torque converter 14 includes a turbine 32, a stator 34, and an impeller 36. Impeller 36 is fixedly connected to engine crankshaft 13 such that impeller 36 rotates as crankshaft 13 rotates. Stator 34 is fixed onto the stator shaft (i.e., the stator tube) of a stator support 40 via a one-way clutch 39. Stator support 40 is fixed to transmission case 28. Turbine 32 is mechanically linked via a turbine hub 42 to input shaft 18.

Notably, transmission 16, as shown in FIG. 2, does not have either an input shaft sensor 22 for directly measuring torque and/or speed of input shaft 18 or an output shaft sensor 24 for directly measuring torque and/or speed of output shaft 20.

In accordance with embodiments of the present invention, a transmission is configured with inventive design concepts and features for enabling the packaging of an input shaft sensor 22 and/or an output shaft sensor 24 within the transmission in which sensors 22 and 24 are magnetic sensors. The packaging of an input shaft sensor 22 within a transmission in accordance with embodiments of the present invention enables direct measurement of torque and/or speed of input shaft 18. Similarly, the packaging of an output shaft sensor 24 within a transmission in accordance with embodiments of the present invention enables direct measurement of torque and/or speed of output shaft 20.

In some embodiments, sensors 22 and 24 are magnetic torque sensors for monitoring torque of input and output shafts 18 and 20, respectively. Similarly, in some embodiments, sensors 22 and 24 are magnetic speed sensors for monitoring speed of shafts 18 and 20, respectively. Further, in some embodiments, sensors 22 and 24 are magnetic torque and speed sensors for monitoring torque and speed of shafts 18 and 20, respectively.

Magnetic torque and speed sensor technology operates optimally with a free smooth surface area on a shaft with constant diameter and controlled hardness, wherein a part of the shaft is magnetized. The magnetic sensor technology makes use of magnetic flux sensing elements such as fluxgate sensors. The sensing elements are preferably stationary and fixed with respect to the rotating magnetized surface of the shaft. Translation of the shaft in either the axial or radial direction relative to the sensor housing is preferably minimized. As indicated above, conventional transmission designs, such as shown in FIG. 2, may represent a challenge for packaging of magnetic sensors.

Sensors 22 and 24 may be magneto-elastic sensors as described in U.S. Pat. Nos. 6,145,387; 6,047,605; 6,553,847; and 6,490,934. Other magnetic sensors may also be used to enable accurate measurements of torque exerted onto a rotating shaft and rotating speed of the shaft without physical contact between a magnetic flux sensing element of the sensor and the shaft.

Figure 3A:
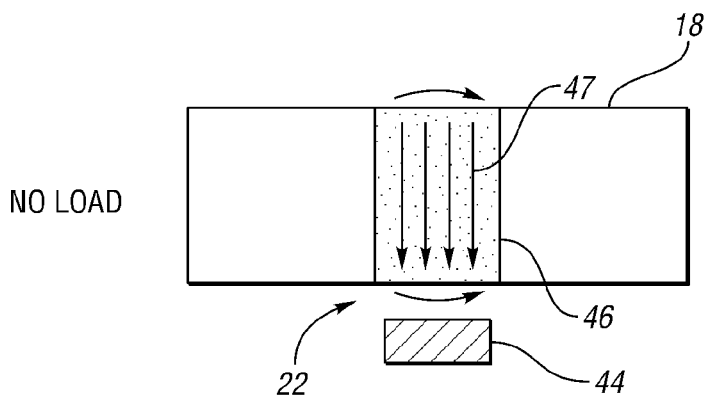
FIGS. 3A, 3B, and 3C illustrate an example of a magnetic torque sensor for detecting torque of a shaft.
Figure 3B:
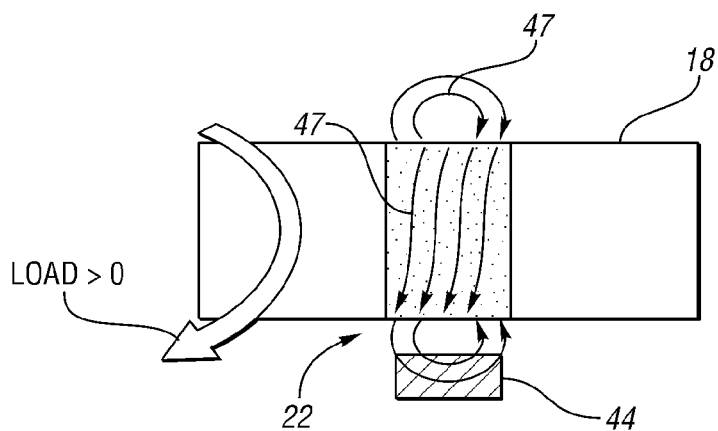
Figure 3C:
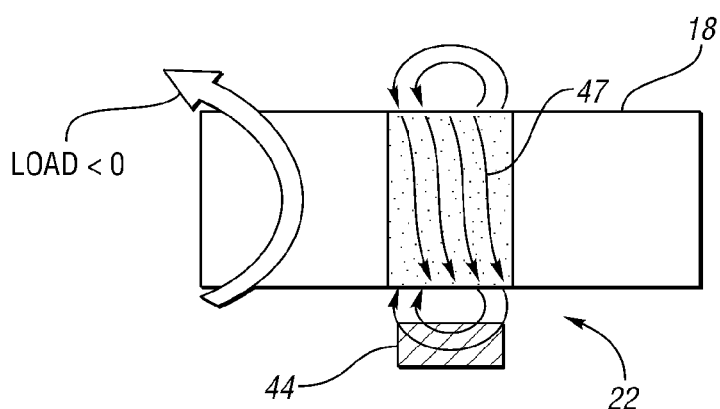

Referring now to FIGS. 3A, 3B, and 3C, an example of a magnetic torque sensor for detecting torque of a shaft will be described. This example assumes that the shaft is input shaft 18 and that the magnetic torque sensor is input shaft sensor 22.

Input shaft sensor 22 includes a magnetic flux sensing element(s) within a sensor housing 44. Input shaft 18 includes a magnetized region 46. Magnetized region 46 circumferentially extends around input shaft 18. Magnetized region 46 may be created by coating magnetized material as a thin layer on a chosen region of input shaft 18 or by magnetizing a region on the shaft. Sensor housing 44 is fixed in position adjacent to the magnetized region 46 of input shaft 18 to enable the sensing element to sense the torque induced signal.

Preferably, shaft 18 is made of steel having high Nickel content, preferably with Martensite structure at the surface layer. Shaft 18 is hardened to enable permanent magnetization. The chosen magnetized region 46 of shaft 18 is magnetized with magnetized material thereon to a designed depth from the surface within the hardened layer. A magnetic pattern or polarity signature may depend on a certain implementation of magneto-elastic torque sensing principles. However, they require a magnetized region 46 of shaft 18 and a sensor housing 44 that contains one or more magnetic flux sensing elements. Sensor housing 44 may include other types of sensing elements such as thermo-couples.

At no load (FIG. 3A), magnetic flux 47 is contained near or within the shaft surface. The illustration in FIG. 3A shows a simplified view of flux direction. Depending on chosen magnetization patterns, magnetic flux may have more complex directional patterns.

When load is applied (i.e., input shaft 18 is twisted), magnetic flux 47 extends from the shaft surface and its axial component which is proportional to the applied torque is measured by the sensing element (FIGS. 3B and 3C). For instance, as shown in FIGS. 3B and 3C, magnetic flux 47 is realigned in one direction when the load is greater than zero and is realigned in the opposite direction when the load is less than zero. Either realignment causes more magnetic flux 47 to come out from the shaft surface in proportion to the load level. As indicated in FIGS. 3B and 3C, the sensing element detects the magnetic flux direction and intensity. Variations of this technology may include, for example, dual band and tri-band magneto-elastic torque sensors.

Figure 4:
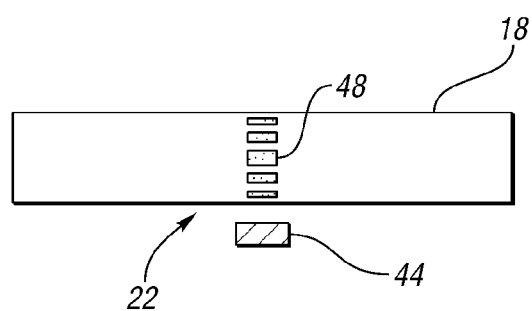
FIG. 4 illustrates an example of a magnetic speed sensor for detecting rotating speed of a shaft.

Referring now to FIG. 4, an example of a magnetic speed sensor for detecting rotating speed of a shaft will be described. Again, this example assumes that the shaft is input shaft 18 and that the magnetic speed sensor is input shaft sensor 22. Input shaft sensor 22 includes sensor housing 44 having magnetic flux sensing element(s). Input shaft 18 includes a magnetized region 48 comprised of magnetic material placed in spots repeatedly around the circumference of input shaft 18 as shown in FIG. 4. Sensor housing 44 is placed near the shaft surface, picking up the circumferential component of magnetic flux. A periodic voltage signal is generated on a magnetic spot as the rotating shaft 18 passes by the sensing element. The periodic voltage signal can be converted into a square wave signal using a comparator circuit which can then be converted into rpm by counting the number of square wave periods. Variations of this technology may include, for example, single band and dual band speed sensors.

For simplicity, a magnetic torque and/or speed sensor is referred to herein as a "magnetic torque sensor" or simply "sensor". However, as described above, such a magnetic torque sensor or sensor may be a magnetic torque sensor only, a magnetic speed sensor only, or a magnetic torque and speed sensor.

With the foregoing description in mind, various embodiments of the present invention will now be described.

Figure 5:
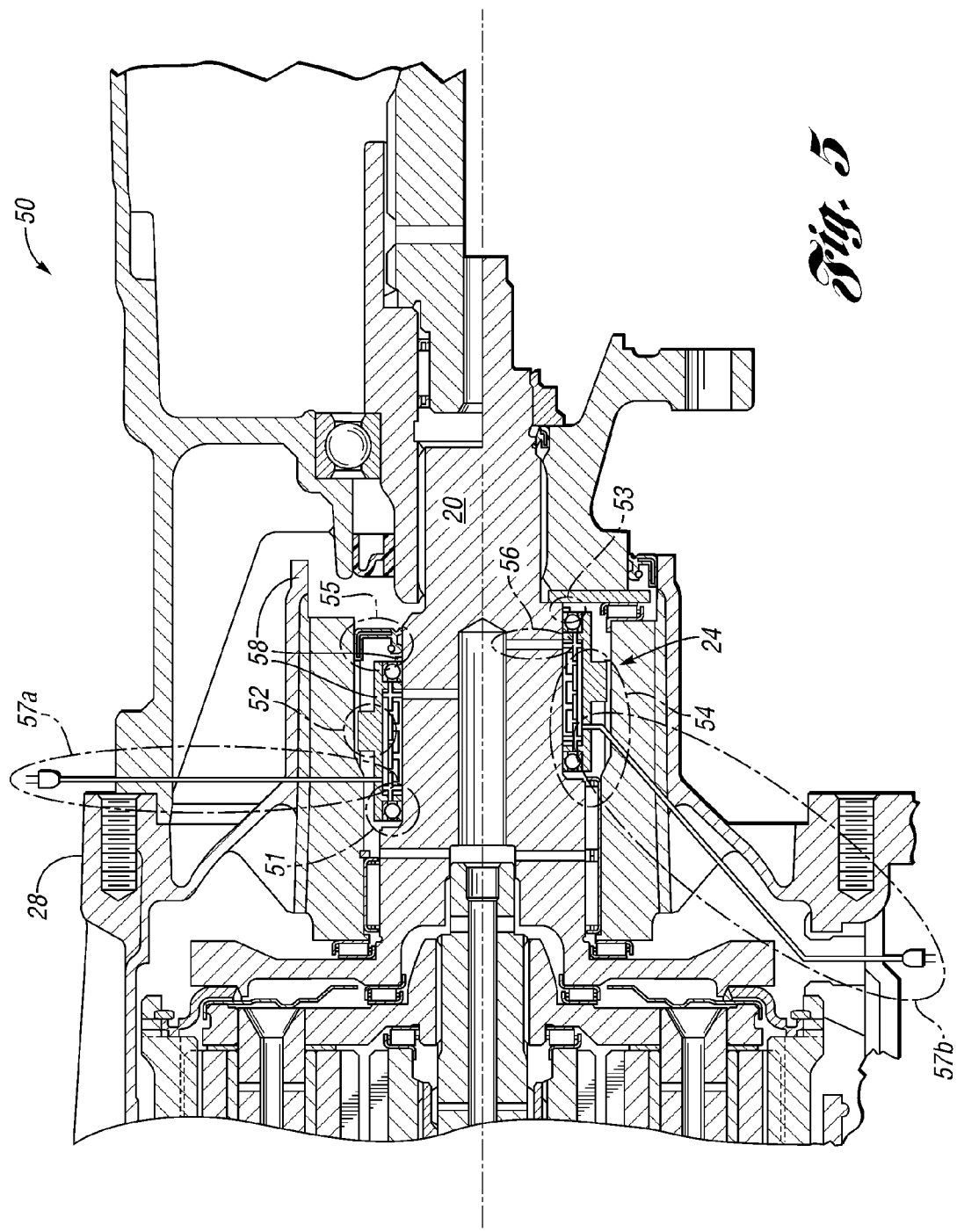
FIG. 5 illustrates a cross-sectional view of an automatic transmission having an output shaft mounted magnetic torque sensor packaging design in accordance with an embodiment of the present invention.
Figure 6:
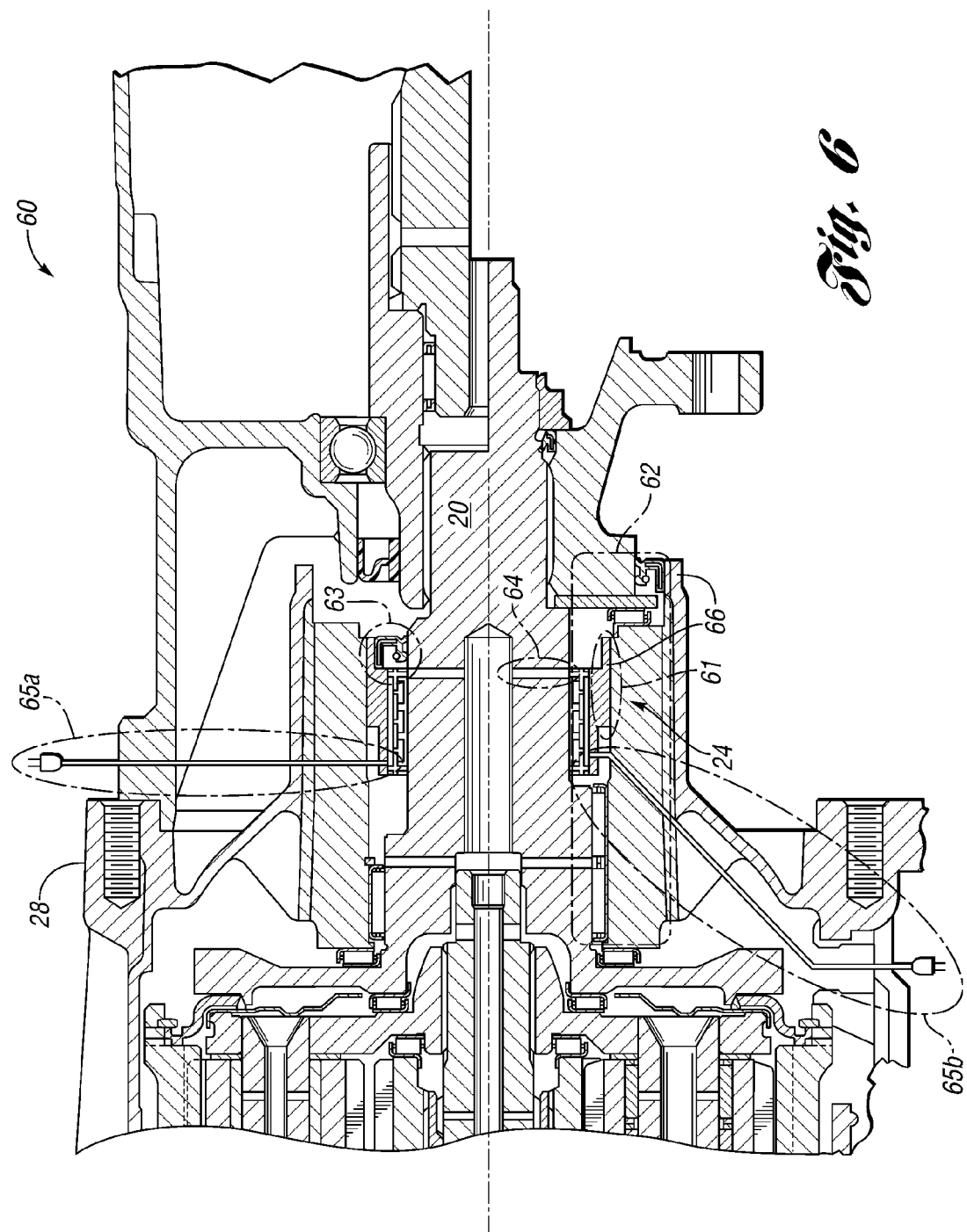
FIG. 6 illustrates a cross-sectional view of an automatic transmission having a case-mounted with press fit magnetic torque sensor packaging design in accordance with an embodiment of the present invention.

With reference to FIGS. 5 and 6, embodiments of the present invention provide unique packaging layouts of a magnetic torque sensor for the output shaft of a transmission.

Referring now to FIG. 5, a cross-sectional view of an automatic transmission 50 having an output shaft mounted magnetic torque sensor packaging design in accordance with an embodiment of the present invention is shown. General features of this design include sensor 24 being supported by friction reduction members such as bearings or bushings to maintain a fixed distance between sensing element 44 of sensor 24 and output shaft 20. The axial and radial alignment of sensor 24 is insensitive to relative motion between output shaft 20 and transmission case 28. An additional axial length is used for the bearings and an anti-rotation device is included.

Particular features, as shown in FIG. 5, of this design include the following. The housing of sensor 24 is mounted on bearings or bushings supporting output shaft 20 as indicated at 51. An anti-rotation device for the housing of sensor 24 can be positioned in several ways. In one way, as indicated at 52, a slot is cut into transmission case 28 and a key is molded to the outside of the sensor housing. A snap ring ensures axial location of sensor 24 relative to output shaft 20 as indicated at 53. The relative diameters of the bearings, sensor 24, the anti-rotation device, and a seal ensure assembly-feasibility as indicated at 54. Sensor 24 is protected from dust since it is sitting inboard of the seal as indicated at 55. A lubrication hole ensures wetting of sensory surface on output shaft 20 and provides passage to lubricate other components (bearing, seal) as indicated at 56. Wiring of sensor 24 is routed internally through transmission case 28 to a common power and control bus (not shown) as indicated at 57*a*. Alternatively, wiring of sensor 24 is routed externally through a seal, preferably near the top of transmission case 28, as indicated at 57*b*. A common transmission case 28, sensor housing, and snap ring can be used for both 4×4 and 4×2 versions as indicated at 58 (4×4 version shown above centerline and 4×2 version shown below centerline).

Referring now to FIG. 6, a cross-sectional view of an automatic transmission 60 having a case-mounted with press fit magnetic torque sensor packaging design in accordance with an embodiment of the present invention is shown. General features of this design include the following. The sensor housing functions as an anti-rotation device and there is no need for sensor bearings of bushings.

Particular features, as shown in FIG. 6, of the design include the following. The sensor housing is mounted to transmission case 28 by press fit as indicated at 61. As such, the press-fitted sensor housing functions as an anti-rotation device and a snap ring for axial positioning of sensor 24 is not required. The relative diameters of the bearings, sensor 24, and the seal ensure assembly-feasibility as indicated at 62. Sensor 24 is protected from dust since it is sitting inboard of the seal (in both 4×2 and 4×4 versions) as indicated at 63. In the 4×4 version (above the centerline), the seal is integrated into the sensor housing. A lubrication hole ensures wetting of sensory surface on output shaft 20 and provides passage to lubricate other components (bearing, seal) as indicated at 64. Wiring of sensor 24 is routed internally through transmission case 28 to a common control bus as indicated at 65*a*. Alternatively, wiring of sensor 24 is routed externally through a seal, preferably near the top of transmission case 28 as indicated at 65*b*. A common transmission case 28 and sensor housing can be used for both 4×4 and 4×2 versions as indicated at 66.

It is briefly noted that the principles of packaging designs in accordance with embodiments of the present invention, as well as the principles of other packaging designs described herein, can be applied to various power-train components including the transfer case, the engine crankshaft, the power take-off shaft, etc.

With reference to FIGS. 7 through 13, embodiments of the present invention provide unique packaging layouts of magnetic torque sensors for a front wheel drive transmission.

Figure 7:
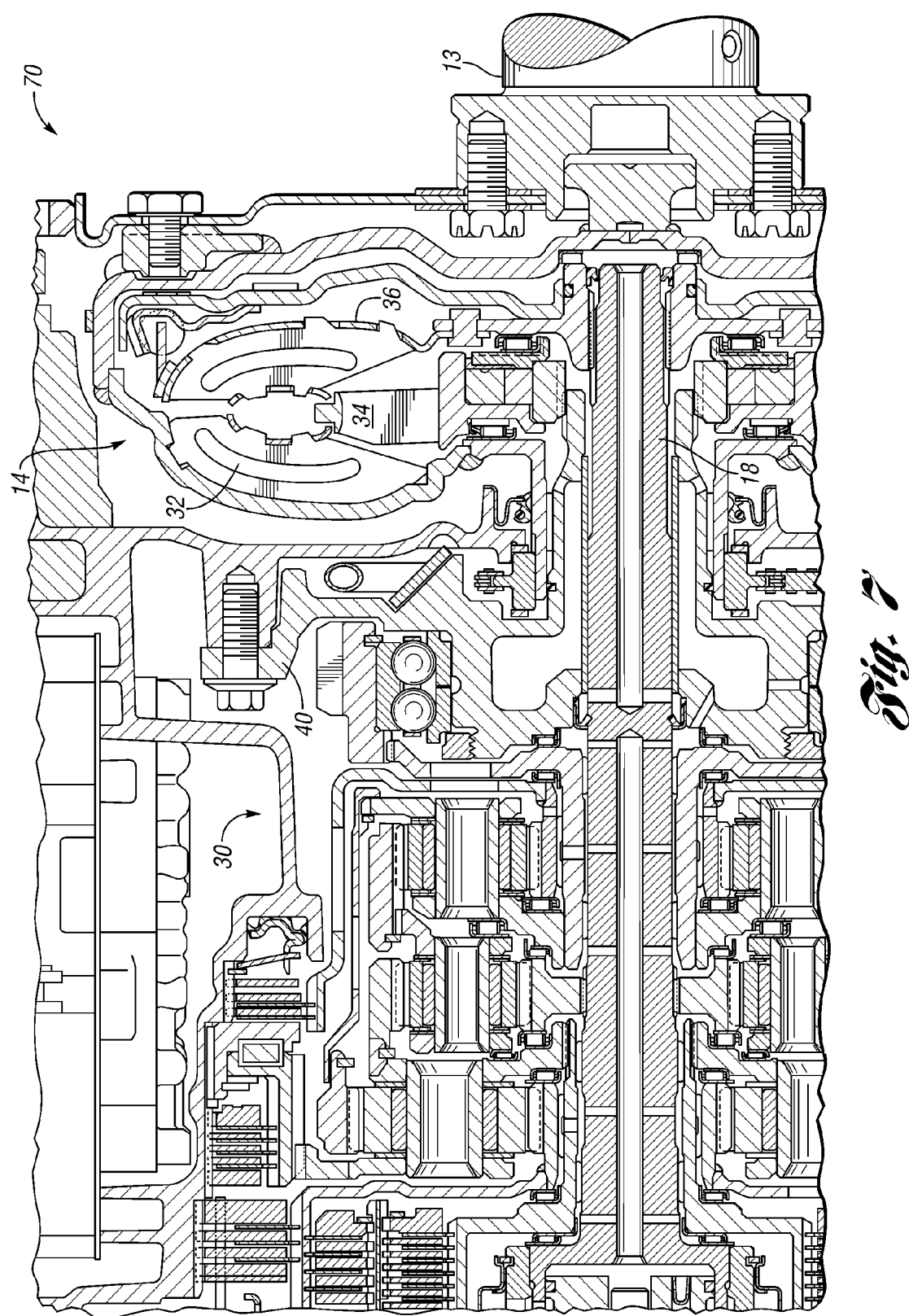
FIG. 7 illustrates a cross-sectional view of the input shaft area of a front wheel drive transmission in which the input shaft area lacks a magnetic torque sensor.

Referring now to FIG. 7, a cross-sectional view of the input shaft area of a front wheel drive transmission 70 in which the input shaft area lacks a magnetic torque sensor is shown. For simplicity, the same reference numerals used above will be used for like components of transmission 70 as is shown in FIG. 7 and as modified in accordance with embodiments of the present invention as described below.

Figure 8:
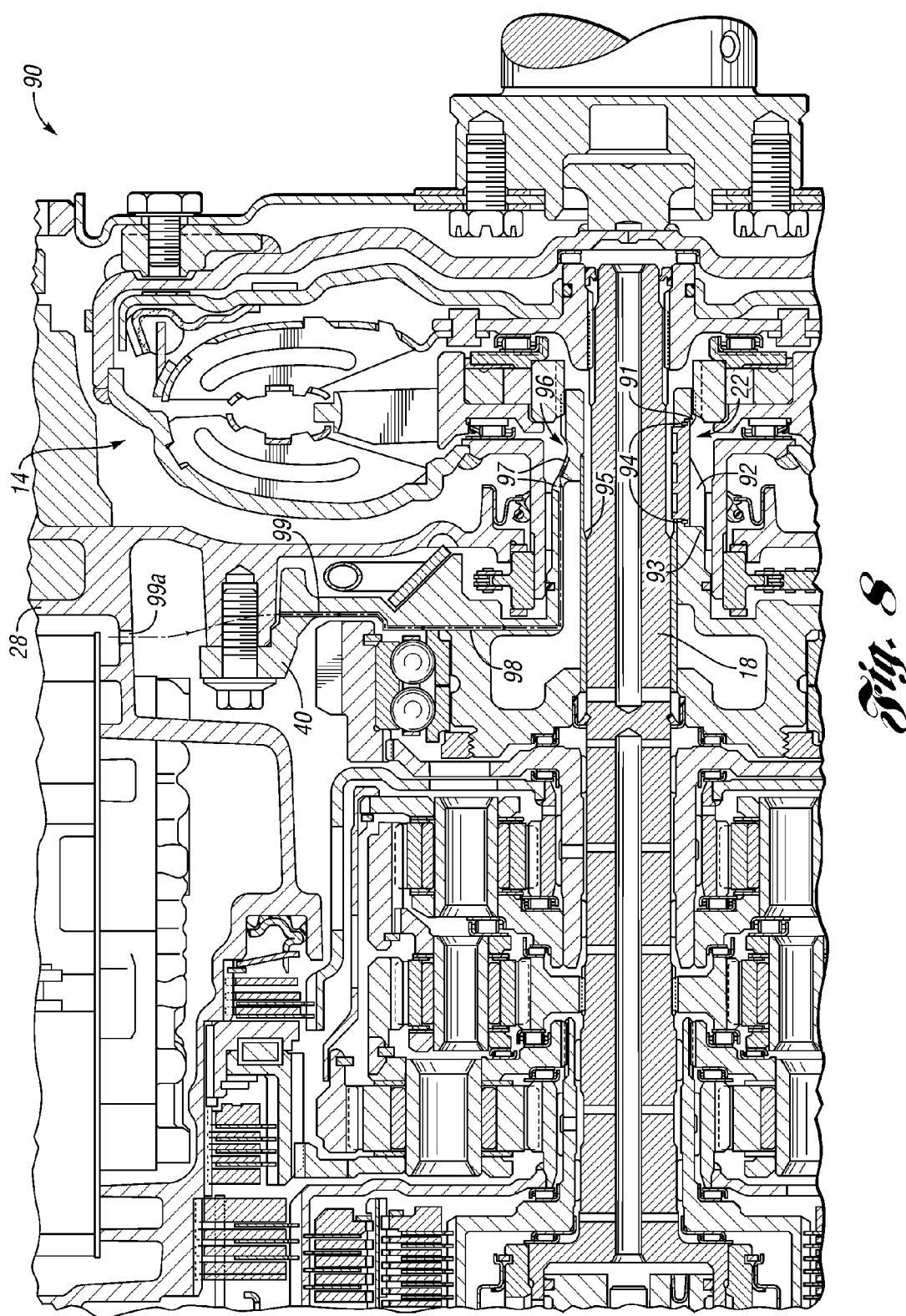
FIG. 8 illustrates a cross-sectional view of the input shaft area of the transmission shown in FIG. 7 having an input shaft magnetic torque sensor packaging design in accordance with an embodiment of the present invention.

Referring now to FIG. 8, a cross-sectional view of the input shaft area of transmission 70 shown in FIG. 7 having an input shaft magnetic torque sensor packaging design 90 in accordance with an embodiment of the present invention is shown. As shown in FIG. 8, features of design 90 include a shortened spline as indicated at 91. Slots are cut into stator support 40 and sleeve (at one and seven o'clock positions) (six o'clock position is just for better illustration) as indicated at 92. A fillet is provided to avoid damaging the bushing as indicated at 93. The PC board enclosure of a sensor 22 is fixed by screws as indicated at 94. The PC board enclosure should not be leak-proof and should withstand 120 psi and oil temperatures of 200 F. to 250 F. The pressure blow off valve is set at 165 psi and heavy towing can impinge 300 F. The ID of the sleeve is changed to the same as the ID of stator support 40 as indicated at 95. The sleeve is pressed in after the wiring of sensor 22 is routed. A groove is milled circumferentially for the wiring as indicated at 96. A groove is milled to feed the wiring through the apply pressure port of torque converter 14 as indicated at 97. Holes are drilled for the wiring at ten o'clock (twelve o'clock position is just for better illustration) as indicated at 98. The wiring is glued and/or sealed in place as further indicated at 98. Grooves are milled for the wiring as indicated at 99. The wiring is routed to a connector at transmission case 28 as indicated at 99*a*.

Figure 9:
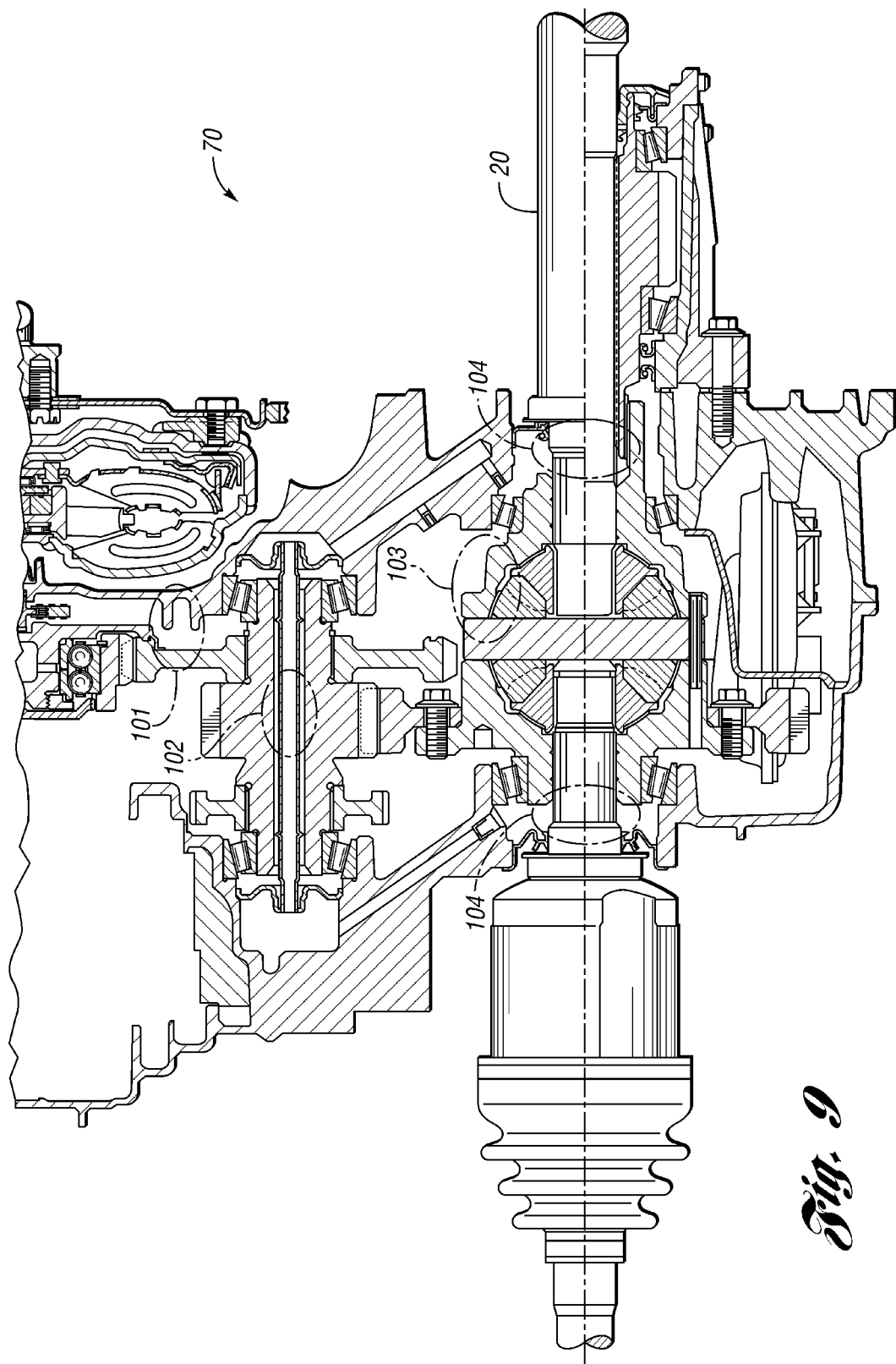
FIG. 9 illustrates a cross-sectional view of the output shaft area of the transmission shown in FIG. 7 in which the output shaft area lacks a magnetic torque sensor.

Referring now to FIG. 9, a cross-sectional view of the output shaft area of transmission 70 shown in FIG. 7 in which the output shaft area lacks a magnetic torque sensor is shown. As indicated in FIG. 9, potential locations for a magnetic torque sensor include: sensor at gear face (idler gear magnetic torque sensor packaging design—FIG. 10) as indicated at 101; sensor on shaft internal diameter (idler gear shaft magnetic torque sensor packaging design—FIG. 11) as indicated at 102; sensor on differential drive carrier (differential hub magnetic torque sensor packaging design—FIG. 12) as indicated at 103; and sensor on half-shaft (half-shaft magnetic torque sensor packaging design—FIG. 13) as indicated at 104.

Figure 10:
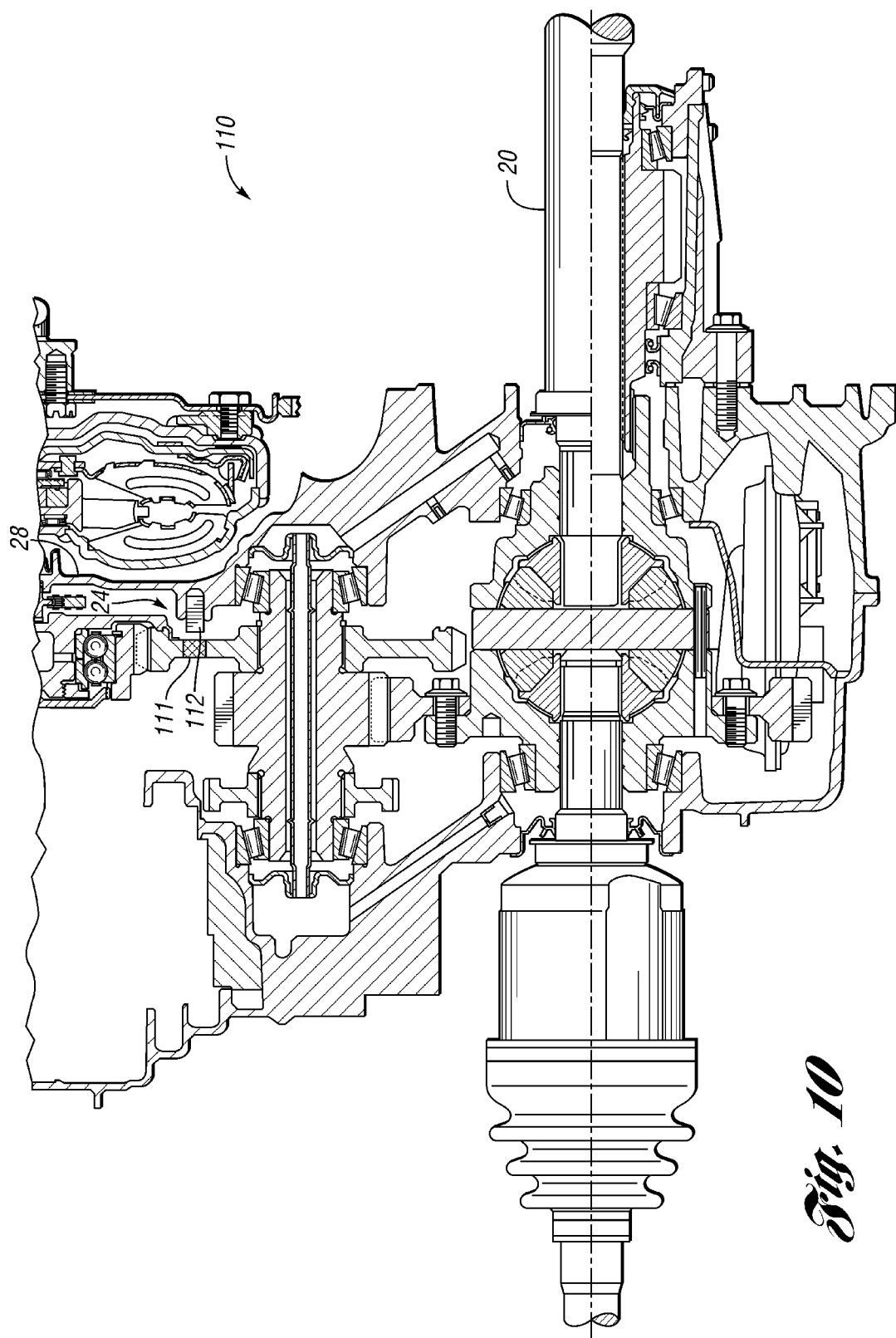
FIG. 10 illustrates a cross-sectional view of the output shaft area of the transmission shown in FIG. 7 having an idler gear magnetic torque sensor packaging design in accordance with an embodiment of the present invention.

Referring now to FIG. 10, with continual reference to FIG. 9, a cross-sectional view of the output shaft area of transmission 70 shown in FIG. 7 having an idler gear magnetic torque sensor packaging design 110 in accordance with an embodiment of the present invention is shown. Features of design 110 include the following. A portion of either an idler gear or a transfer gear is magnetized on its surface to produce a magnetic sensing region as indicated at 111. The sensing element of magnetic torque sensor 24 is mounted into transmission case 28 or bulkhead adjacent to the magnetized surface of the idler gear as indicated at 112.

Figure 11:
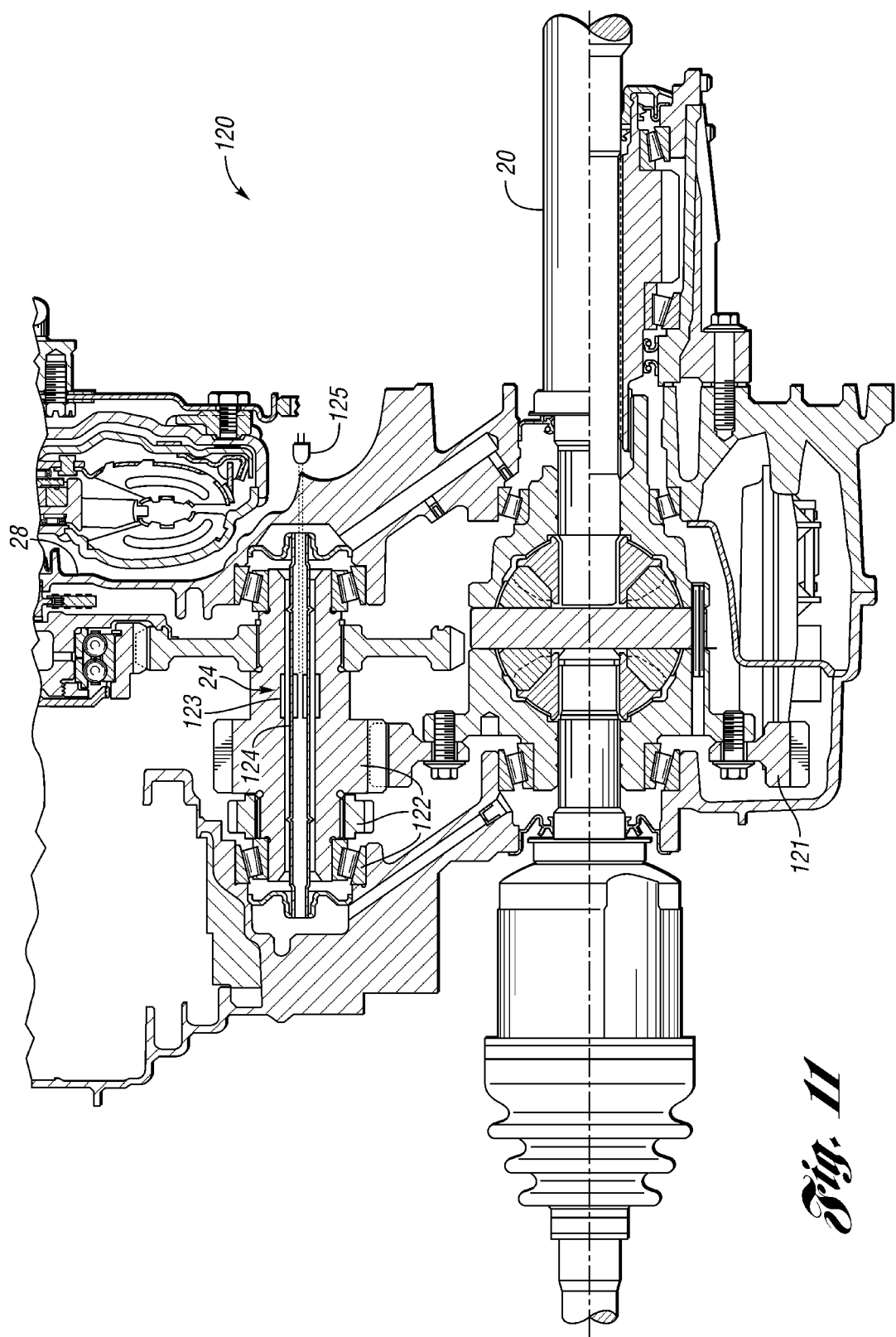
FIG. 11 illustrates a cross-sectional view of the output shaft area of the transmission shown in FIG. 7 having an idler gear shaft magnetic torque sensor packaging design in accordance with an embodiment of the present invention.

Referring now to FIG. 11, with continual reference to FIG. 9, a cross-sectional view of the output shaft area of transmission 70 shown in FIG. 7 having an idler gear shaft magnetic torque sensor packaging design 120 in accordance with an embodiment of the present invention is shown. Features of design 120 include the following. The gear of the differential drive is flipped onto the left side as indicated at 121 (for instance, compare with FIG. 9). The gear of the idler shaft, the parking gear, and the bearing are moved to the left as indicated at 122. The features indicated at 122 further include reducing the parking gear diameter and making a corresponding minor change to transmission case 28. A portion of the internal surface of the idler gear shaft is magnetized to produce a magnetic sensing region as indicated at 123. The sensing element of magnetic torque sensor 24 is mounted onto a sleeve running through the internal diameter of the idler gear as indicated at 124. Wiring of the sensing element is routed out through the sleeve as indicated at 125.

With continual reference to FIG. 11, in another variation the outer surface of a portion of the idler shaft between the transfer shaft input gear and the transfer shaft output gear includes a magnetized region. A sensor is mounted to the case adjacent to the magnetized region to read the torque of the idler shaft.

Figure 12:
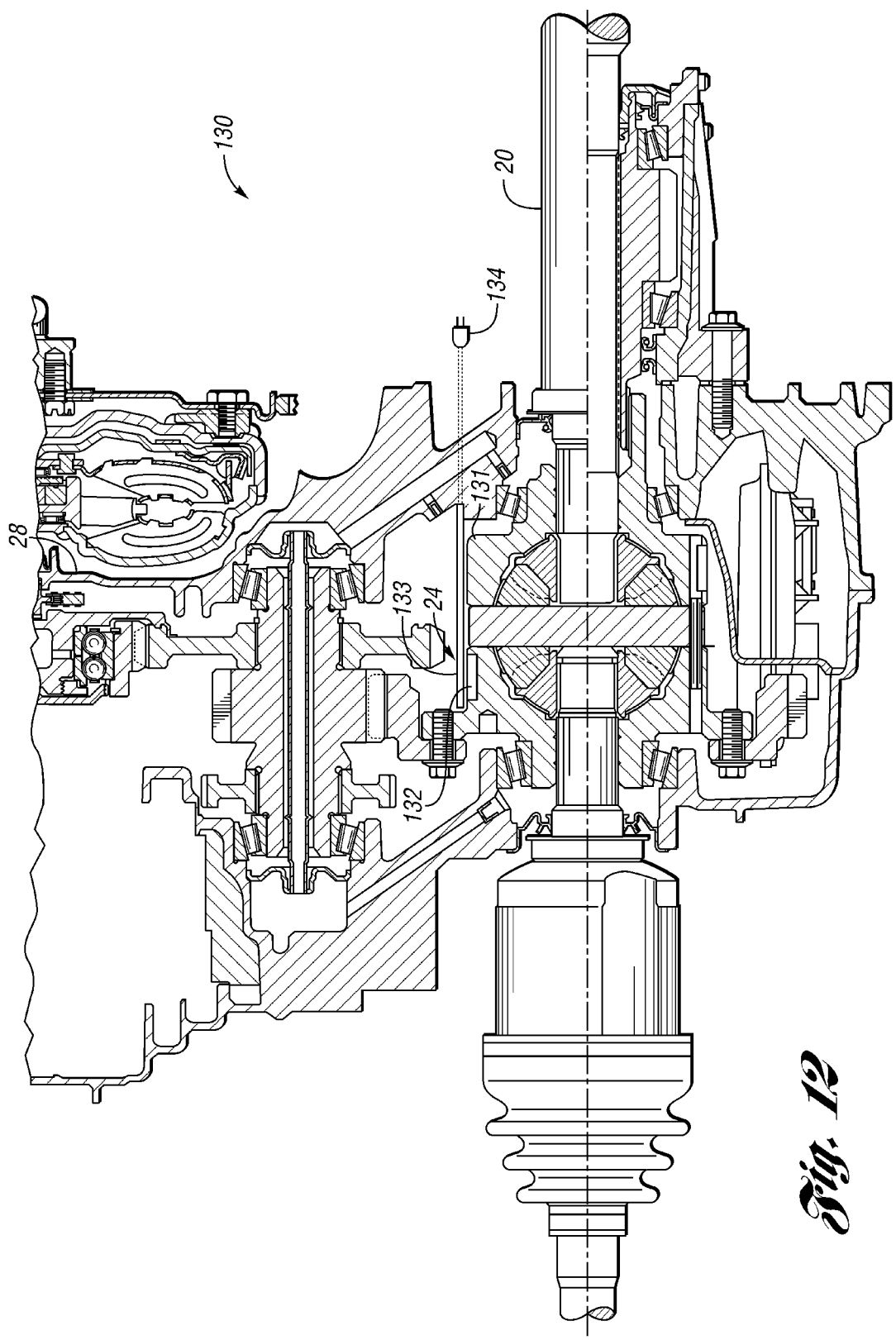
FIG. 12 illustrates a cross-sectional view of the output shaft area of the transmission shown in FIG. 7 having a differential hub magnetic torque sensor packaging design in accordance with an embodiment of the present invention.

Referring now to FIG. 12, with continual reference to FIG. 9, a cross-sectional view of the output shaft area of transmission 70 shown in FIG. 7 having a differential hub magnetic torque sensor packaging design 130 in accordance with an embodiment of the present invention is shown. Features of design 130 include the following. The surface of the differential drive carrier is extended as indicated at 131. A portion of the carrier surface is magnetized as indicated at 132. The sensing element of magnetic torque sensor 24 is mounted onto transmission case 28 adjacent the magnetized carrier surface as indicated at 133. Wiring of the sensing element is routed out as indicated at 134. In another embodiment, the sensing element of magnetic torque sensor 24 is mounted onto transmission case 28 between the final drive (bevel) gear and the side carrier pin shaft and adjacent the magnetized carrier surface.

Figure 13:
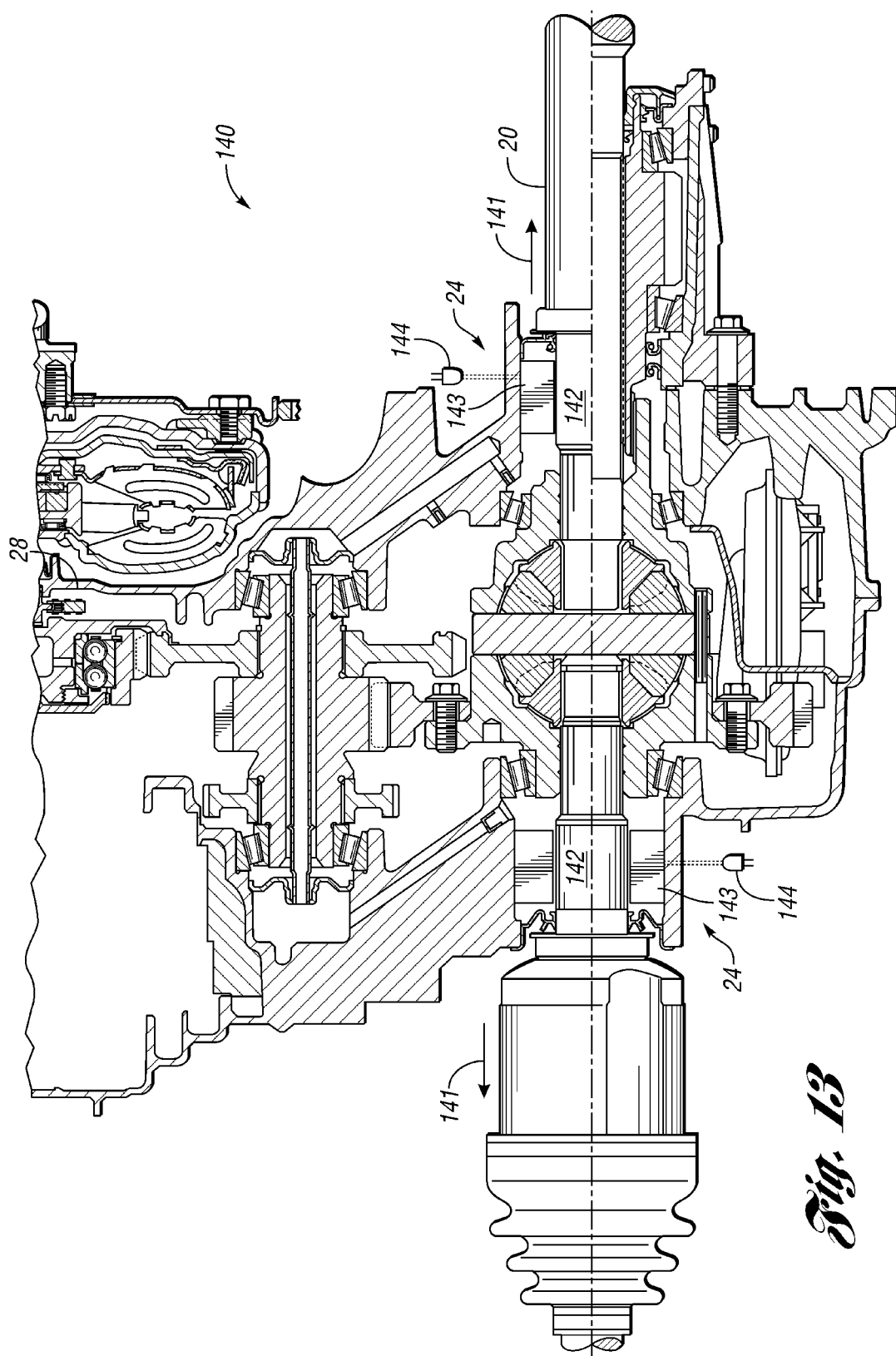
FIG. 13 illustrates a cross-sectional view of the output shaft area of the transmission shown in FIG. 7 having a half-shaft magnetic torque sensor packaging design in accordance with an embodiment of the present invention.

Referring now to FIG. 13, with continual reference to FIG. 9, a cross-sectional view of the output shaft area of transmission 70 shown in FIG. 7 having a half-shaft magnetic torque sensor packaging design 140 in accordance with an embodiment of the present invention is shown. Design 140 is for FWD only. Features of design 140 include the following. The half-shaft and the associated seal are moved axially away from the transmission in both directions (i.e. to the left and to the right) as indicated at 141. This requires a change to transmission case 28. The surfaces of half-shafts are magnetized in the manner described above as indicated at 142. The sensing elements of magnetic torque sensors 24 are mounted onto transmission case 28 adjacent the magnetized surfaces of the half-shafts, respectively, as indicated at 143. Wiring of the sensing elements is routed out as indicated at 144.

Figure 14:
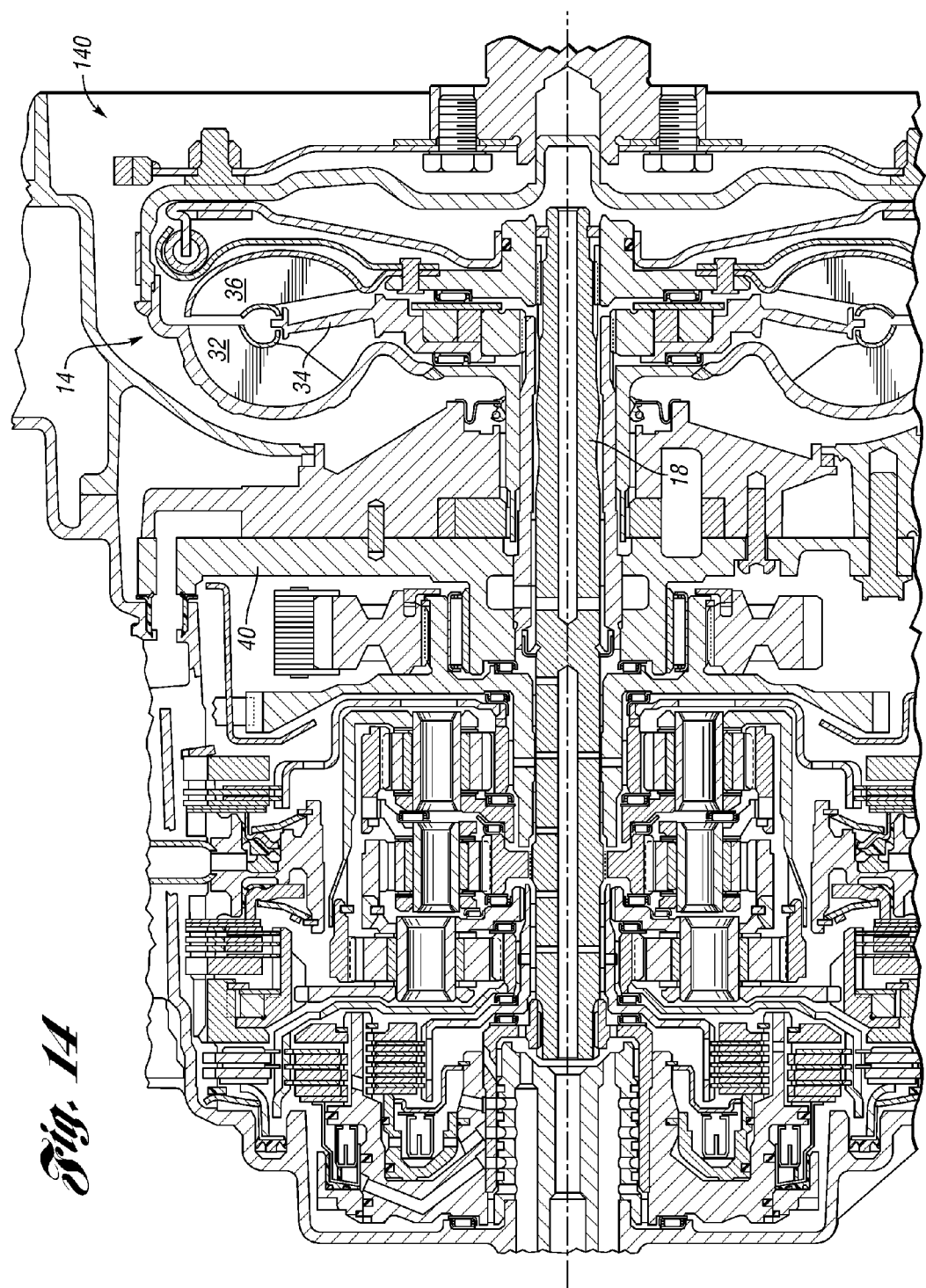
FIG. 14 illustrates a cross-sectional view of the input shaft area of another front wheel drive transmission in which the input shaft area lacks a magnetic torque sensor.
Figure 15:
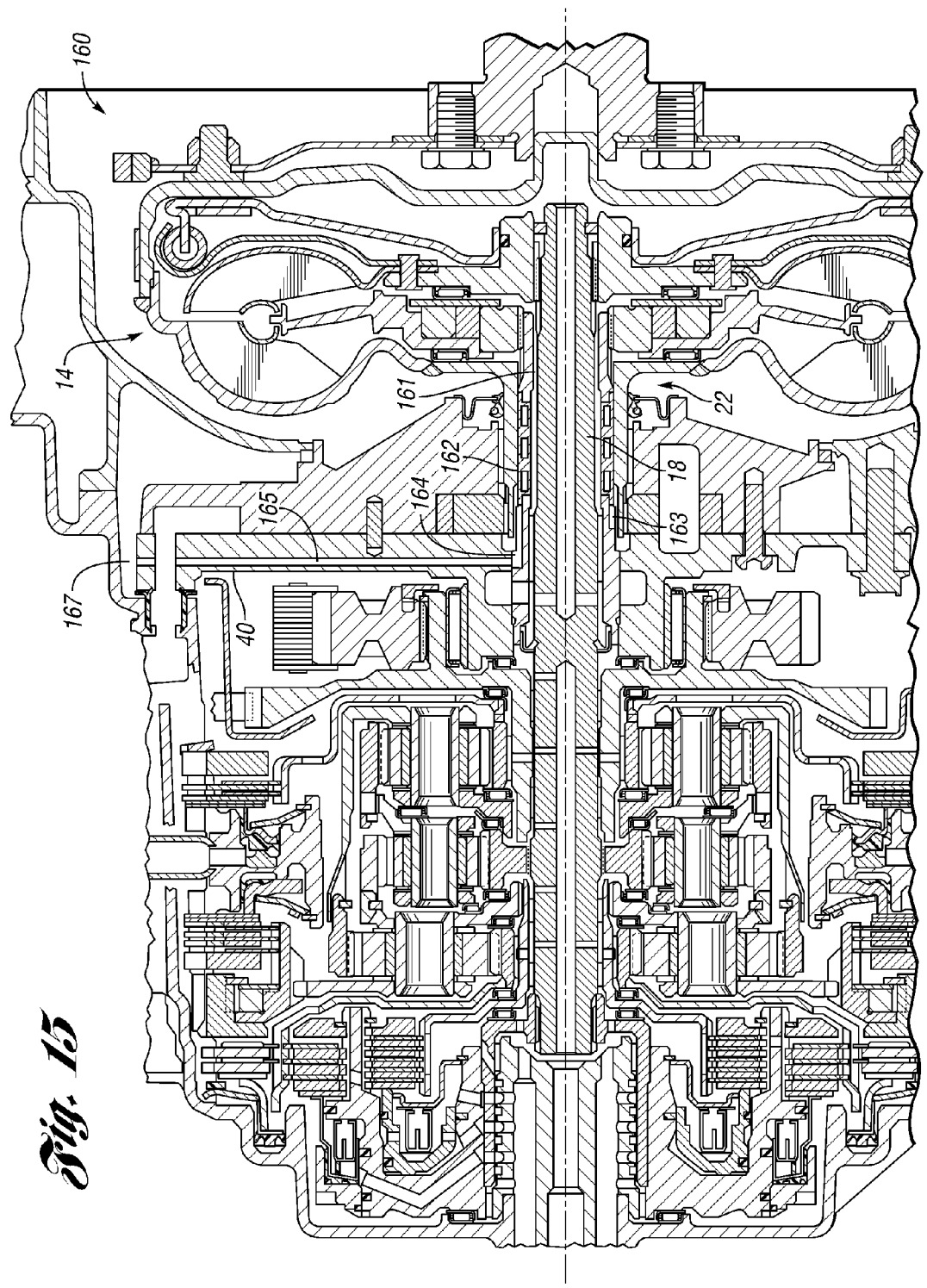
FIG. 15 illustrates a cross-sectional view of the input shaft area of the transmission shown in FIG. 14 having an input shaft magnetic torque sensor packaging design in accordance with an embodiment of the present invention.

With reference to FIGS. 14 and 15, an embodiment of the present invention provides a unique packaging layout of a magnetic torque sensor for input shaft of another front wheel drive transmission.

Referring now to FIG. 14, a cross-sectional view of the input shaft area of a front wheel drive transmission 140 in which the input shaft area lacks a magnetic torque sensor is shown. For simplicity, the same reference numerals used above will be used for like components of transmission 140 as is shown in FIG. 14 and as modified in accordance with an embodiment of the present invention as described below.

Referring now to FIG. 15, a cross-sectional view of the input shaft area of transmission 140 shown in FIG. 14 having an input shaft magnetic torque sensor packaging design 160 in accordance with an embodiment of the present invention is shown. In transmission 140, stator assembly 40 is made of a stator support and a stator tube which press-fit together to form stator assembly 40. The assembled stator assembly 40 is interconnected with a pump assembly by bolts in this design. As shown in FIG. 15, features of design 160 include the following. The outside diameter of input shaft 18 is made straight as indicated at 161. Slots (windows) are cut in stator support 40 for the PC board and enclosure of magnetic torque sensor 22 as indicated at 162. A circumferential groove is milled for the wiring of the sensing element of sensor 22 as indicated at 163. An axial groove is milled for the wiring as indicated at 164. A hole is drilled for the wiring and the wiring is glued and/or sealed in place as indicated at 165. The wiring is routed out of the transmission as indicated at 167.

Figure 16:
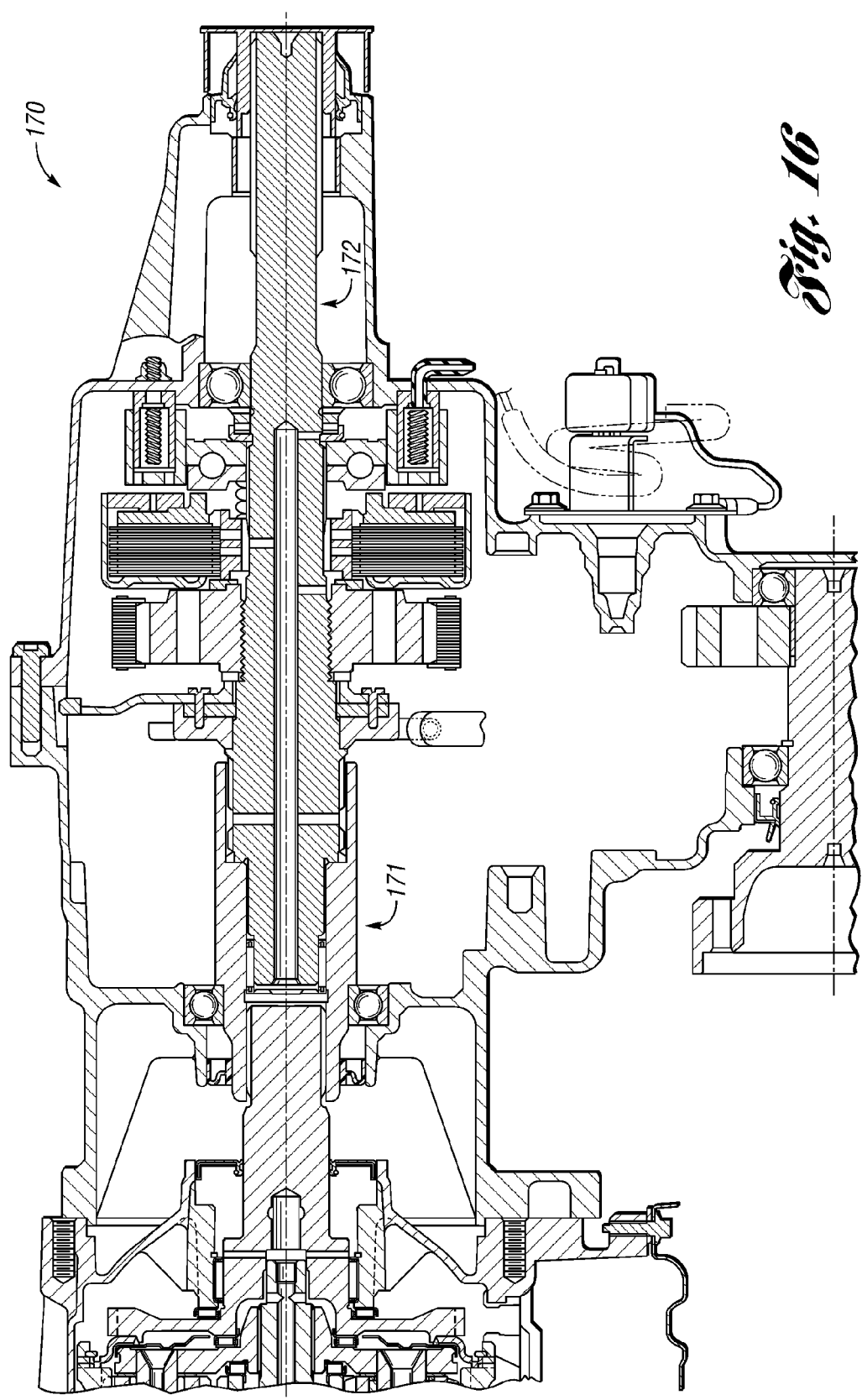
FIG. 16 illustrates a cross-sectional view of a rear wheel drive transfer case with all-wheel drive (AWD) in which the transfer case lacks a magnetic torque sensor.
Figure 17:
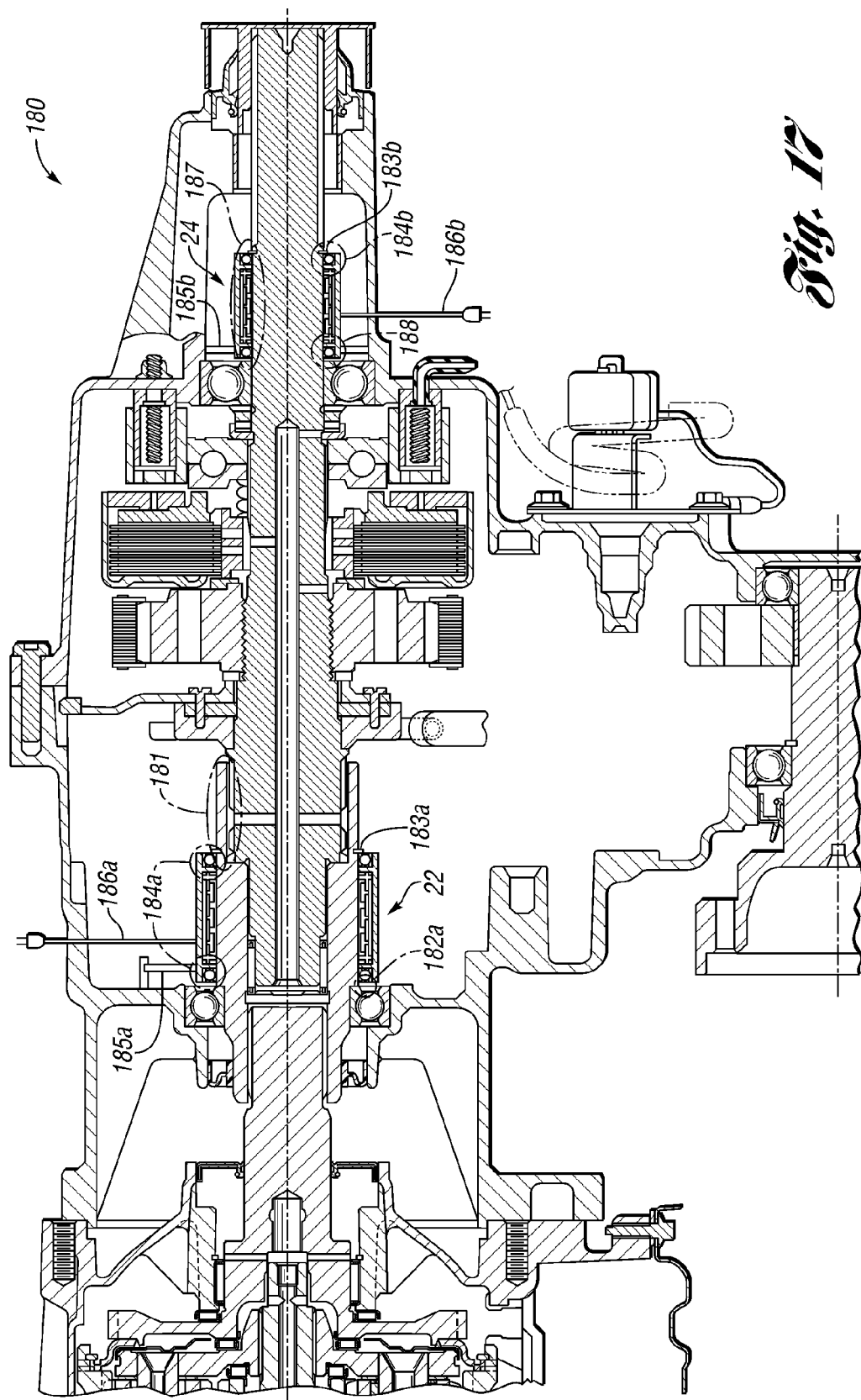
FIG. 17 illustrates a cross-sectional view of the transfer case shown in FIG. 16 having a shaft-mounted magnetic torque sensor packaging design in accordance with an embodiment of the present invention.
Figure 18:
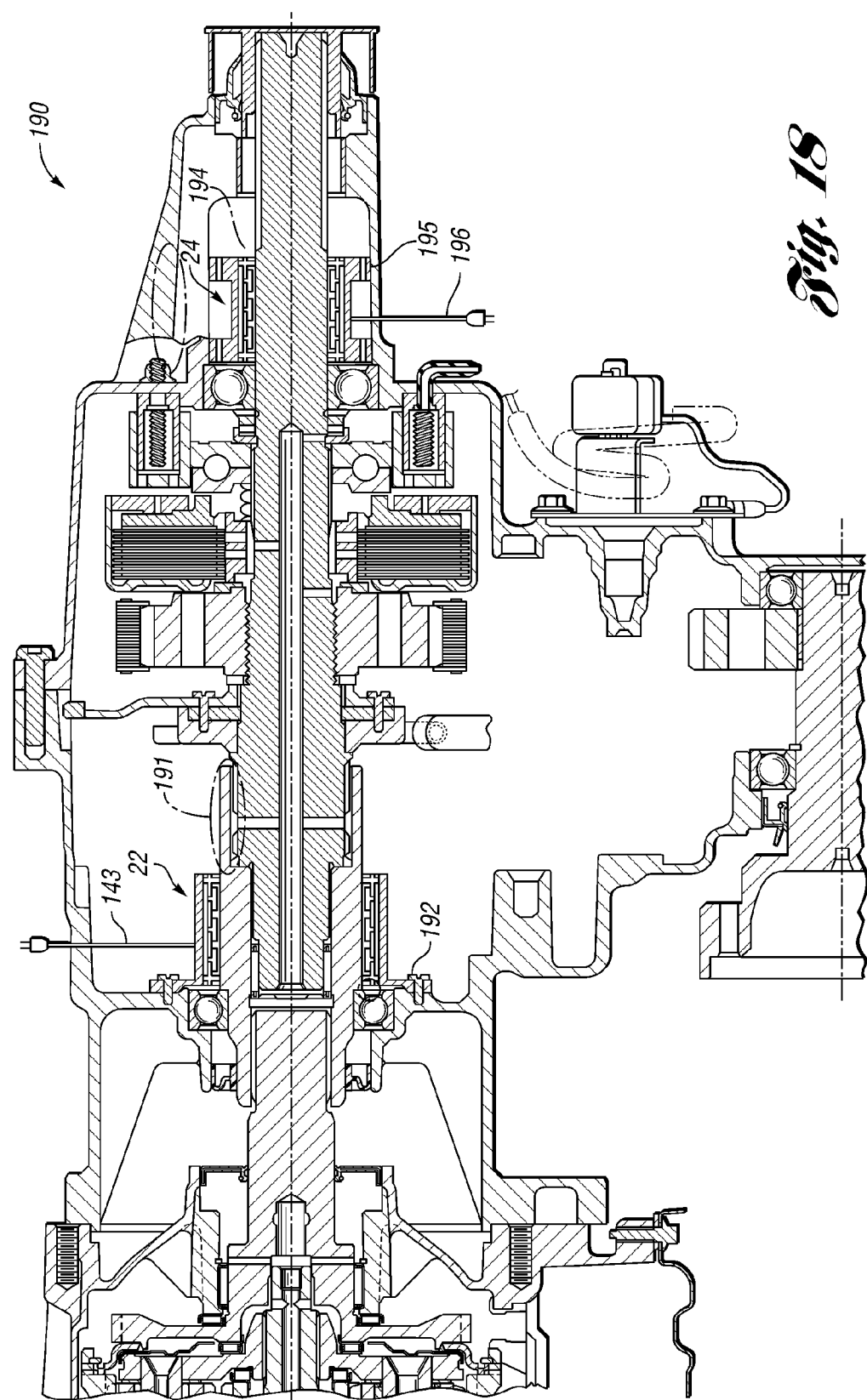
FIG. 18 illustrates a cross-sectional view of the transfer case shown in FIG. 16 having a case-mounted magnetic torque sensor packaging design in accordance with an embodiment of the present invention.

With reference to FIGS. 16, 17, and 18, embodiments of the present invention provide unique packaging layouts of magnetic torque sensors for a rear wheel drive transfer case with all-wheel drive (AWD).

Referring now to FIG. 16, a cross-sectional view of a rear wheel drive transfer case 170 in which transfer case 170 lacks a magnetic torque sensor is shown. For simplicity, the same reference numerals used above will be used for like components of transfer case 170 as is shown in FIG. 16 and as modified in accordance with embodiments of the present invention as described below.

As indicated in FIG. 16, potential first and second placement options for a magnetic torque sensor include: sensor on the input shaft (large diameter, smooth outer surface) as indicated at 171; and sensor on the output shaft (small diameter, sensor linearity range may be reduced) as indicated at 172.

Referring now to FIG. 17, a cross-sectional view of transfer case 170 shown in FIG. 16 having a shaft mounted magnetic torque sensor packaging design 180 in accordance with an embodiment of the present invention is shown. Design 180 includes the first and second placement options indicated above.

Features of design 180 pursuant to the first option in which a magnetic torque sensor 22 is on the input shaft include the following. Splines are moved to the right (up to the pump's shoulder) to gain more axial space for sensor 22 as indicated at 181. This modification is needed to both of the input and output shafts. Sensor 22 is axially located at one end by a shoulder on the input shaft as indicated at 182*a*. Sensor 22 is axially located at the other end by a snap ring as indicated at 183*a*. The housing of sensor 22 is supported by bearings as indicated at 184*a*. An anti-rotation finger is provided as indicated at 185*a*. Wiring of the sensing element of sensor 22 is routed out through a standard connector as indicated at 186*a*.

Features of design 180 pursuant to the second option in which a magnetic torque sensor 24 is on the output shaft include the following. The diameter of the output shaft is increased as possible to avoid reduction in the linearity range of sensor 24 as indicated at 187. Sensor 24 is axially located at one end by a washer as indicated at 188. Sensor 24 is axially located at the other end by a snap ring as indicated at 183*b*. The housing of sensor 24 is supported by bearings as indicated at 184*b*. An anti-rotation finger is provided as indicated at 185*b*. Wiring of the sensing element of sensor 24 is routed out through a standard connector as indicated at 186*b*. In either option, along with the other embodiments described herein, magnetic shields can be incorporated in the sensor housing.

Referring now to FIG. 18, a cross-sectional view of transfer case 170 shown in FIG. 16 having a case-mounted magnetic torque sensor packaging design 190 in accordance with an embodiment of the present invention is shown. Design 190 also includes the first and second options.

Features of design 190 pursuant to the first option in which a magnetic torque sensor 22 is on the input shaft include the following. Splines are moved to the right (up to the pump's shoulder) to gain more axial space for sensor 22 as indicated at 191. This modification is needed to both of the input and output shafts. The housing of sensor 22 is mounted to the transfer case housing by screws as indicated at 192. This supports the sensor housing axially and in a radial manner and functions as an anti-rotation device. The wiring of the sensing element of sensor 22 is routed out through a standard connector as indicated at 193.

Features of design 190 pursuant to the second option in which a magnetic torque sensor 24 is on the output shaft include the following. The diameter of the output shaft is increased as possible to avoid reduction in the linearity range of sensor 24 as indicated at 194. The housing of sensor 24 is press fit into the transfer case housing as indicated at 195. This supports the sensor housing axially and in a radial manner and functions as an anti-rotation device. The wiring of the sensing element of sensor 24 is routed out through a standard connector as indicated at 196. Again, in either option, magnetic shields can be incorporated in the sensor housing.

Referring now to FIG. 19A, a cross-sectional view of a magnetic torque sensor packaging design 200 in a rear-wheel drive (RWD) axle in accordance with an embodiment of the present invention is shown. FIG. 19B illustrates an enlarged view of the encircled portion of FIG. 19A.

As shown in FIG. 19B, modifications are made to an original design indicated by 202 (top half of drawing) to produce the inventive design indicated by 204 (bottom half of drawing). The modifications to the original design include making the input shaft diameter uniform, locating sensor 22, installing a sensor bobbin indicated at 206. Installing the sensor bobbin includes providing a lube hole indicated at 208 and incorporating a spacer indicated at 210 such that the sensor bobbin has anti-rotation capability. The sensor bobbin is a slide-in housing which is press fitted. Contact points with the housing are close to the outer race of bearings so that radial movement relative to the shaft is minimized. The modifications further include routing a wire from the sensor bobbin through the axle housing 214. The wire includes a heavy duty cover for protection against motion and possible damage due to mud, ice, etc. A connector is attached to the other end of the wire as indicated at 212 for easy installation and removal.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle assembly comprising:
an axle housing;
a shaft having a magnetized region;
an outer race for a bearing supporting the shaft;
a spacer extending directly from the outer race along an axial axis of the shaft;
a sensor bobbin having a magnetic sensor for detecting torque of the shaft, the bobbin press-fit mounted axially between the housing and the spacer with the spacer maintaining axial position of the bobbin relative to the housing.

2. The assembly of claim 1 wherein:
the sensor bobbin includes a channel running therethrough for conveying lubrication to areas adjacent the sensor.

3. The assembly of claim 1 wherein:
the sensor bobbin includes a connector-plug, wherein the axle housing includes a channel leading to the sensor bobbin, wherein the connector-plug is received within the channel of the axle housing and plugs through the sensor bobbin into the sensor.

\* \* \* \* \*